Dec. 23, 1969  U. P. RONALD  3,485,224
COMPOSITE ELECTRIC CABLE WITH MECHANICAL PROTECTION
FOR STRUCTURALLY WEAK CONDUCTIVE ELEMENTS
Filed Nov. 14, 1967
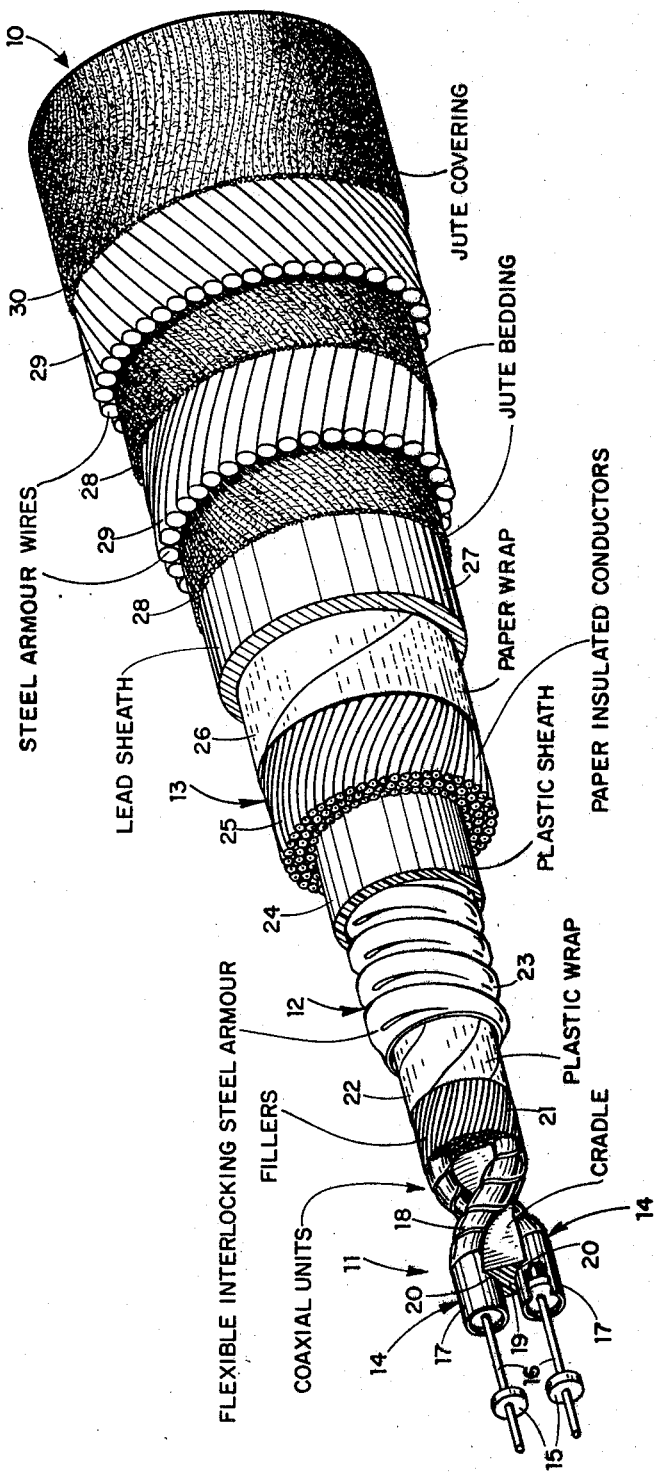
*INVENTOR*
U.P. RONALD
AGENTS
*Curphey & Erickson*

United States Patent Office 3,485,224
Patented Dec. 23, 1969

3,485,224
COMPOSITE ELECTRIC CABLE WITH MECHANICAL PROTECTION FOR STRUCTURALLY WEAK CONDUCTIVE ELEMENTS
Ulrich Paul Ronald, Roxboro, Quebec, Canada, assignor to Northern Electric Company Limited, Montreal, Quebec, Canada
Filed Nov. 14, 1967, Ser. No. 682,769
Int. Cl. H01b 17/22
U.S. Cl. 174—109
9 Claims

ABSTRACT OF THE DISCLOSURE

A composite submarine communications cable with a twisted pair of disc-insulated coaxial units having an elongated soft rubber cradle yieldably separating them, and being located axially of the cable loosely within a tube formed by a helical steel strip with interlocking adjacent turns. Twisted pairs of individually paper-insulated telephone conductors are cabled about the steel tube and the whole is disposed within a multi-layer protective sheath of lead, jute and steel armour wires.

This invention relates generally to the provision of mechanical protection for structurally-weak conductive elements in electric cables, particularly composite electric cables having both structurally-weak conductive elements and conductive elements capable of withstanding mechanical stresses imposed upon the cable.

It is often economically expedient to combine various types of conductive elements in a single electric cable. This is frequently the case with communications cables where it may be desirable for the same cable to be able to transmit different types of electrical signals through conductive elements of different constructions. For example, one or more coaxial units for multi-channel telephone signals, television signals and other high frequency transmission may be combined with conventional paired telephone conductors for local or supervisory circuits.

Composite cables of coventional construction are not practical where structurally-weak conductive elements would be exposed to damage due to mechanical stresses appearing in the cable during installation or service. Probably the most severe mechanical stresses, both longitudinal and compressive, are encountered by submarine cables. High longitudinal stresses occur where abrupt shore lines or irregular bottoms leave substantial unsupported lengths of cable. Steel armour wires are normally provided in one or more helically-wrapped layers and secured at either end of the cable to suitable anchoring devices to strength the cable longitudinally, and further to provide protection against abrasion damage. Up to a point, however, the steel armour wires augment the problem of longitudinal stresses by adding significantly to the weight of the cable.

Radial compressive stresses are also prevalent to a significant degree in submarine cables. They are due in part to the pressure of the surrounding water. They are also due however to the longitudinal stresses in the helical armour wires which cause the wire to tighten about and squeeze the cable.

Conductive elements, such as paper or plastic insulated telephone conductors, which consist of single or stranded solid wires embedded in a continuous layer of substantially solid insulating material, can usually withstand fairly substantial mechanical stresses particularly when stranded together in pluralities to form a relatively solid core of a cable. On the other hand, structurally-weak conduction elements such as disc-insulated coaxial units would be vulnerable to mechanical stresses of the same magnitude, and especially to stresses of the magnitude improsed upon the conductive elements in submarine cables. Thus the usual composite cable constructions in which all of the conductive elements regardless of type are stranded together are useless wherever the cable core may be subjected to stresses exceeding the limits of the most vulnerable elements.

At the same time, however, it may not be possible to make a separate cable containing only the structurally-weak elements. Regardless of the presence of external strength members forming the sheath of a cable, much of the mechanical strength of the cable is due to the load carrying capacity of the conductive core. Thus, a cable whose core is devoid of strong conductive elements is inherently weak. This means in some instances that structurally weak elements must be included in a composite cable if they are to be used at all.

It is a purpose of this invention to provide a particularly simple and economical solution to the problem of including structurally-weak conductive elements in a composite cable which are incapable of withstanding the mechanical stresses that may be imposed upon the rest of the conductive elements of the cable core. Basically, the structurally-weak elements are enclosed within a tubular strength member which isolates them structurally from the stronger conductive elements. Thus the stresses imposed upon the stronger elements are exerted on the tubular strength member which prevents them from being transferred to the structurally-weak elements.

It has also been found advisable where more than one structurally-weak conductive element is disposed within the tubular strength member, to separate the conductive elements from each other within the tubular member by compressible spacing means. Should the tubular member deform slightly under load, any stresses transmitted thereby to the conductive elements inside will be at least partially relieved by yielding of the spacing means to permit movement of the elements together into a more compact formation. Where the structurally-weak elements are helically twisted or stranded about each other, such movement is effective to relieve longitudinal stresses in the elements since the effective length of the elements increases as the diameter of the helix decreases under yielding of the spacing means.

A preferred embodiment of the invention will now be described with reference to the drawing.

The composite electric cable 10 illustrated in the single figure of the drawing is a submarine cable for transmitting different types of communications signals. The core of the cable consists basically of structurally-weak conductive elements 11 centrally located along the axis of the cable and enclosed within a tubular strength member 12, outside of which are wrapped a plurality of stronger conductive elements 13 which are capable of withstanding the mechanical stresses that may be imposed upon the cable core.

The structurally-weak elements 11 are a pair of coaxial units 14 of the type in which plastic discs 15 are spaced along the centre conductor 16 to support the outer tubular conductor 17 over which is applied one or more helical steel strips 18 for mechanical strength and electromagnetic shielding. Extending longitudinally between the coaxial units 14 and helically twisted about its own axis in unison with the twisted units 14 is an elongated cradle 19 of soft compressible rubber with opposite longitudinal edges shaped transversely at 20 to receive respective ones of the coaxial units. The cradle 19 provides compressible spacing means which is yieldable to permit the coaxial units to move together into a more compact formation to relieve at least partially radial and longitudinal stresses.

Fillers 21 of paper, jute or other suitable material are used to round out the cross-section of the coaxial units 11 and cradle 19, and the assembly is secured by a helical wrapping of plastic tape 22.

The coaxial unit assembly is disposed within the tubular strength member 12 which is loose fitting to provide some radial clearance to allow for possible distortion of the tubular member 12 before any radial stresses can be transferred to the coaxial units 11 through contact with member 12. In the disclosed embodiment, the tubular member is formed from a helical steel strip 23 transversely formed so that adjacent turns interlock. This construction normally occurs as a flexible interlocking armour on the outside of cables and is a particularly useful and economical construction for the tubular strength member of this invention. It is flexible and has both radial and longitudinal strength.

A plastic sheath 24 is extruded over the convoluted outer surface of the tubular member 12 to provide a smooth surface on which to apply the conductive elements 13 which in the illustrated cable are paper insulated telephone conductors 25. A paper tape 26 helically wrapped about the conductors 25 secures them against damage and displacement while the outer protective layers are applied, and also provides an additional dielectric barrier.

The outer protective layers shown in the drawing are conventional for a submarine cable containing paper insulated telephone conductors. A lead sheath 27 is extruded over the paper wrapped conductors and is followed by alternate layers of jute bedding 28 and steel armour wires 29. An overall jute covering 30 provides external corrosion protection for the outer layer of armour wires. The layers 28 and 30 of jute are usually impregnated with asphaltic materials (not shown) to provide moisture resistance.

With the construction according to this invention, the fragile coaxial units 11 are isolated from the mechanical stresses in the surrounding stronger telephone conductors 25 by the tubular member 12 of flexible interlocking steel armour. The member 12 is slightly larger in diameter than the coaxial unit assembly inside so that some distortion of the member 12 can occur before pressure is applied to the coaxial units 14. Even then the compressible cradle 19 will allow the coaxial units to move together and thus relieve any stress transmitted to them by distortion of the tubular member 12. Of course, any longitudinal stress that may occur in the coaxial units 11 will also be relieved by movement of the units closer together under yielding of the cradle 19 as mentioned hereinabove.

It will be understood that many variations of this invention will be readily perceived by those skilled in the art. Although two disc-insulated coaxial units helically twisted together have been described as the structurally-weak conductive elements to be protected from the mechanical stresses in the other elements of the cable, the invention is not dependent upon the number of conductive elements or their particular construction. It is possible of course to employ more than one tubular strength member in the same cable, each providing mechanical protection for one or more conductive elements.

The invention can be utilized not only in composite communications cables having different information carrying conductive elements but also in electric power cables having certain energy carrying conductors requiring protection, or even for combination communications-power cables. Although the present invention has been described generally with respect to submarine cables, the principles are equally applicable to any cable in which certain conductive elements must be isolated from the stresses imposed upon other conductive elements in the cable.

The tubular strength member 12 is, as stated hereinbefore, preferably larger in diameter than the conductive elements inside to allow for some distortion of the tubular member. If, however, the tubular member is strong enough to resist the imposed stresses without distortion or if the conductive elements inside the member can tolerate limited distortion of the tubular member, radial clearance between the conductive elements and the tubular member may not be necessary.

What is claimed is:
1. A composite electric cable comprising:
 (a) at least one conductive element which is structurally weak relative to compressive mechanical stresses in the cable and susceptible to being damaged by such stresses,
 (b) a plurality of conductive elements capable of withstanding such stresses,
 (c) a tubular strength member highly resistive to compressive forces loosely enclosing the structurally-weak conductive element to isolate that said element structurally from said plurality of conductive elements and from said stresses, and
 (d) an overall protective sheath.

2. A composite electric cable as defined in claim 1 in which the structurally-weak element is positioned centrally of the cable and the longitudinal axis of the tubular strength member coincides with the longitudinal axis of the cable.

3. A composite electric cable as defined in claim 1 in which the tubular strength member comprises a helical metal strip with adjacent turns thereof interlocking.

4. A composite electric cable as defined in claim 3 in which the metal strip is steel.

5. A composite electric cable as defined in claim 1 having a pair of structurally-weak conductive elements within the tubular strength member, the cable further comprising:
 (e) compressible spacing means separating the structurally weak elements from each other.

6. A composite electric cable as defined in claim 5 in which the compressible spacing means is an elongated cradle of soft rubber extending longitudinally of the cable and having opposite edges suitably shaped transversely to receive respective ones of said structurally-weak elements.

7. A composite electric cable as defined in claim 6 in which the structurally-weak elements are twisted about each other longitudinally of the cable, and the soft rubber cradle therebetween is similarly twisted about its longitudinal axis to maintain the spacing between the twisted elements.

8. A composite electric cable as defined in claim 7 in which the structurally-weak conductive elements are disc-insulated coaxial units.

9. A composite electric cable as defined in claim 1 having a twisted pair of disc-insulated coaxial units positioned centrally of the cable and an elongated compressible cradle of soft rubber positioned between said coaxial units to keep them in yieldable spaced relation throughout the length of the cable, the tubular strength member enclosing said coaxial units and formed by a helical steel strip with adjacent edges interlocking, and said plurality of conductive elements comprising individually-insulated telephone conductors disposed uniformly around the tubular strength member.

References Cited

UNITED STATES PATENTS 1,753,079  4/1930  Zapf _____ 174—113 X

FOREIGN PATENTS 1,104,504  11/1955  France.
881,294  4/1943  France.

OTHER REFERENCES

German printed application, No. 1,037,539, Aug. 28, 1958, Siemens & Halske Aktiengesellschaft.

LARAMIE E. ASKIN, Primary Examiner
A. T. GRIMLEY, Assistant Examiner

U.S. Cl. X.R.

174—105, 113, 116